United States Patent
Yuhasz

(10) Patent No.: US 10,202,510 B2
(45) Date of Patent: Feb. 12, 2019

(54) PIGMENTS BASED ON LISBO3 AND LINBO3 RELATED STRUCTURES

(71) Applicant: The Shepherd Color Company, Cincinnati, OH (US)

(72) Inventor: William M. Yuhasz, West Chester, OH (US)

(73) Assignee: The Shepherd Color Company, Cincinnati, OH (US)

( * ) Notice: Subject to any disclaimer, the term of this patent is extended or adjusted under 35 U.S.C. 154(b) by 0 days.

(21) Appl. No.: 14/929,949

(22) Filed: Nov. 2, 2015

(65) Prior Publication Data

US 2016/0122548 A1 May 5, 2016

Related U.S. Application Data

(60) Provisional application No. 62/074,317, filed on Nov. 3, 2014.

(51) Int. Cl.
*C09C 1/00* (2006.01)
*C09C 1/36* (2006.01)
(Continued)

(52) U.S. Cl.
CPC .......... *C09C 1/0096* (2013.01); *C01G 30/026* (2013.01); *C01G 33/006* (2013.01);
(Continued)

(58) Field of Classification Search
CPC .. C01G 30/002; C01G 30/026; C01G 33/006; C01G 35/006; C01G 51/006;
(Continued)

(56) References Cited

U.S. PATENT DOCUMENTS 3,424,551 A  1/1969 Owen
4,075,029 A  2/1978 Nuss
(Continued)

FOREIGN PATENT DOCUMENTS

JP  2004-511612 A  4/2004

OTHER PUBLICATIONS

Ordering phenomena in the LiSbO3 type structure: The new mixed tellurates Li2TiTeO6 and Li2SnTeO6 to Choisnet et al. Journal of Solid State Chemistry;vol. 82, Issue 2, Oct. 1989, pp. 272-278.*
(Continued)

*Primary Examiner* — Shuangyi Abu Ali
(74) *Attorney, Agent, or Firm* — Frost Brown Todd LLC

(57) ABSTRACT

The present invention involves pigments derived from compounds with the $LiSbO_3$-type or $LiNbO_3$-type structures. These compounds possess the following formulations $M^1M^5Z_3$, $M^1M^2M^4M^5Z_6$, $M^1M^3_2M^5Z_6$, $M^1M^2M^3M^6Z_6$, $M^1_2M^4M^6Z_6$, $M^1M^5M^6Z_6$, or a combination thereof. The cation $M^1$ represents an element with a valence of +1 or a mixture thereof, the cation $M^2$ represents an element with a valence of +2 or a mixture thereof, the cation $M^3$ represents an element with a valence of +3 or a mixture thereof, the cation $M^4$ represents an element with a valence of +4 or a mixture thereof, the cation $M^5$ represents an element with a valence of +5 or a mixture thereof, and the cation $M^6$ represents an element with a valence of +6 or a mixture thereof. The cation M is selected from H, Li, Na, K, Rb, Cs, Mg, Ca, Sr, Ba, Sc, Y, La, Ce, Pr, Nd, Sm, Eu, Gd, Tb, Dy, Ho, Er, Tm, Yb, Lu, Ti, Zr, Hf, V, Nb, Ta, Cr, Mo, W, Mn, Fe, Ru, Co, Ni, Cu, Ag, Zn, B, Al, Ga, In, Si, Ge, Sn, P, Sb, or Te. The anion Z is selected from N, O, S, Se, Cl, F, hydroxide ion or a mixture thereof. Along with the elements mentioned above vacancies may also reside on the M or Z sites of the above formulations such that the structural type
(Continued)

is retained. The above formula may also include M dopant additions below 20 atomic %, where the dopant is selected from H, Li, Na, K, Rb, Cs, Mg, Ca, Sr, Ba, Sc, Y, La, Ce, Pr, Nd, Sm, Eu, Gd, Tb, Dy, Ho, Er, Tm, Yb, Lu, Ti, Zr, Hf, V, Nb, Ta, Cr, Mo, W, Mn, Fe, Ru, Co, Ni, Cu, Ag, Zn, B, Al, Ga, In, Si, Ge, Sn, P, Sb, Bi, Te, or mixtures thereof.

4 Claims, 13 Drawing Sheets

(51) Int. Cl.
| | | |
|---|---|---|
| *C01G 30/02* | (2006.01) | |
| *C01G 33/00* | (2006.01) | |
| *C01G 35/00* | (2006.01) | |
| *C01G 51/00* | (2006.01) | |
| *C04B 28/02* | (2006.01) | |
| *C04B 14/30* | (2006.01) | |
| *C01G 30/00* | (2006.01) | |
| *C08K 3/24* | (2006.01) | |
| *C08K 9/02* | (2006.01) | |
| *C04B 103/54* | (2006.01) | |

(52) U.S. Cl.
CPC ......... *C01G 35/006* (2013.01); *C01G 51/006* (2013.01); *C04B 14/30* (2013.01); *C04B 28/02* (2013.01); *C09C 1/00* (2013.01); *C09C 1/36* (2013.01); *C01G 30/002* (2013.01); *C01P 2002/52* (2013.01); *C01P 2002/72* (2013.01); *C01P 2002/76* (2013.01); *C01P 2002/77* (2013.01); *C01P 2002/80* (2013.01); *C01P 2002/84* (2013.01); *C01P 2004/51* (2013.01); *C01P 2004/61* (2013.01); *C01P 2006/62* (2013.01); *C01P 2006/63* (2013.01); *C01P 2006/64* (2013.01); *C01P 2006/65* (2013.01); *C01P 2006/66* (2013.01); *C04B 2103/54* (2013.01); *C08K 3/24* (2013.01); *C08K 9/02* (2013.01)

(58) Field of Classification Search
CPC .............. C01P 2002/52; C01P 2002/72; C01P 2002/76; C01P 2002/77; C01P 2002/80; C01P 2002/84; C01P 2004/51; C01P 2004/61; C01P 2006/62; C01P 2006/63; C01P 2006/64; C01P 2006/65; C01P 2006/66; C08K 3/24; C08K 9/02; C09C 1/00; C09C 1/0096; C09C 1/36
See application file for complete search history.

(56) References Cited

U.S. PATENT DOCUMENTS

| | | |
|---|---|---|
| 4,251,283 A | 2/1981 | Balducci et al. |
| 4,292,294 A | 9/1981 | Patil et al. |
| 4,448,608 A | 5/1984 | Jenkins et al. |
| 6,541,112 B1 | 4/2003 | Swiler et al. |
| 6,565,973 B2 | 5/2003 | Duff et al. |
| 7,763,149 B2 | 7/2010 | Maggard |
| 8,282,728 B2 | 10/2012 | Subramanian et al. |

OTHER PUBLICATIONS

International Search Report dated Jan. 27, 2016 for Application No. PCT/US2015/058613, 64 pgs.
Tarte, Pierre; Gabelica-Robert, Melanie: "Nouveaux Antimonates Et Tellurates Complexes Structuralement Apparentes A L'antimonate De Lithium Lisb03", Comptes Rendus Des Seances De L'academie Des Sciences, Serie 2: Mecanique-Physique, Chimie, Sciences De La Terre, vol. 296, No. 4, (1983): 261-264.
Woodward, Patrick M., et al. "Structural Studies and Order-Disorder Phenomenon in a Series of New Quaternary Tellurates of the Type A2+ M4+ Te6+ O6 and A1+ 2M4+ Te6+ O6." Journal of Solid State Chemistry 147.1 (1999): 99-116.
Knapp, Meghan C., and Patrick M. Woodward. "A-site cation ordering in AA' BB' O 6 perovskites." Journal of Solid State Chemistry 179.4 (2006): 1076-1085.
Blanco, M. Cecilia, et al. "Synthesis and characterization of the new two-dimensional Heisenberg antiferromagnet double perovskite BaLaCuSbO 6." Dalton Transactions 44.23 (2015): 10860-10866.
U.S. Appl. No. 62/074,317, filed Nov. 3, 2014.
Castellanos, M. "The Ternary System Li 2 O-Sb 2 O 5-CuO." Solid-State Chemistry of Inorganic Materials IV as held at the 2002 MRS Fall Meeting, 2002.
Edstrand, M. A. I. A., and N. I. L. S. Ingri. "The crystal structure of the double lithium antimony (V) oxide LiSbO 3." Acta Chem. Scand 8.6 (1954).
Fourquet, J. L., A. Le Bail, and P.A. Gillet. "LiNbWO6: Crystal structure of its two allotropic forms." *Materials Research Bulletin* 23.8 (1988): 1163-1170.
Goodenough, John B. "Exploring the A+ B5+ O3 compounds." Journal of Solid State Chemistry 6.4 (1973): 493-501.
Nalbandyan, Vladimir Babkenovich, Maxim Avdeev, and Andrey Aleksandrovich Pospelov. "Ion exchange reactions of NaSbO3 and morphotropic series MSbO3." Solid state sciences 8.12 (2006): 1430-1437.
Paul, Marcus, Mitsuharu Tabuchi, and Anthony R. West. "Defect structure of Ni, co-doped LiNbO3 and LiTaO3." Chemistry of materials 9.12 (1997): 3206-3214.
Pospelov, A. A., et al. "Crystal structure and properties of a new mixed-valence compound LiMn2TeO6 and the survey of the LiMM'XO6 family (X=Sb or Te)." Solid State Sciences 13.11 (2011): 1931-1937.
Sleight, A. W., and C. T. Prewitt. "Preparation of CuNbO3 and CuTaO3 at high pressure." Materials Research Bulletin 5.3 (1970): 207-211.

* cited by examiner

Figures 1(a) and (b)

Figures 2(a) and (b)

PIGMENTS BASED ON LISBO3 AND LINBO3 RELATED STRUCTURES

CROSS-REFERENCE TO RELATED APPLICATIONS

This application claims priority to U.S. provisional application No. 62/074,317, entitled, "Pigments based on $LiSbO_3$ and $LiNbO_3$ related structures," filed Nov. 3, 2014, which is incorporated by reference herein in its entirety.

BACKGROUND

Pigments based on the $LiSbO_3$ and $LiNbO_3$ type structures have not been reported. Materials with these crystal structure types have been studied in relation to piezoelectric, linear, and nonlinear optical material applications. The following work discloses a wide range of new pigment types based on $LiSbO_3$-type and $LiNbO_3$-type structures. These materials possess unique coloristic qualities as well as unusually high chemical stability.

BRIEF SUMMARY

The pigments disclosed in this work are compounds that possess a crystal structure related to the $LiSbO_3$-type or $LiNbO_3$-type structures. These structures possess chemical formulas with the following variations:

$M^1M^5Z_3$, $M^1M^2M^4M^5Z_6$, $M^1M^3_2M^5Z_6$, $M^1M^2M^3M^6Z_6$, $M^1_2M^4M^6Z_6$, $M^1M^5M^6Z_6$, or combination thereof, where the cation $M^1$ is an element with a valence of +1 or a mixture thereof;
where the cation $M^2$ is an element with a valence of +2 or a mixture thereof;
where the cation $M^3$ is an element with a valence of +3 or a mixture thereof;
where the cation $M^4$ is an element with a valence of +4 or a mixture thereof;
where the cation $M^5$ is an element with a valence of +5 or a mixture thereof;
where the cation $M^6$ is an element with a valence of +6 or a mixture thereof;
with M selected from H, Li, Na, K, Rb, Cs, Mg, Ca, Sr, Ba, Sc, Y, La, Ce, Pr, Nd, Sm, Eu, Gd, Tb, Dy, Ho, Er, Tm, Yb, Lu, Ti, Zr, Hf, V, Nb, Ta, Cr, Mo, W, Mn, Fe, Ru, Co, Ni, Cu, Ag, Zn, B, Al, Ga, In, Si, Ge, Sn, P, Sb, or Te; where the anion Z is selected from N, O, S, Se, Cl, F, hydroxide ion or a mixture thereof; and where vacancies may reside on the M or Z site such that the structural type is retained. The term dopant is used to refer to substitutions that result in a deficiency or excess of the anion Z away from the ideal stoichiometry without substantially changing the structure. As well as variants that include M dopant additions below 20 atomic %, where the dopant is selected from H, Li, Na, K, Rb, Cs, Mg, Ca, Sr, Ba, Sc, Y, La, Ce, Pr, Nd, Sm, Eu, Gd, Tb, Dy, Ho, Er, Tm, Yb, Lu, Ti, Zr, Hf, V, Nb, Ta, Cr, Mo, W, Mn, Fe, Ru, Co, Ni, Cu, Ag, Zn, B, Al, Ga, In, Si, Ge, Sn, P, Sb, Bi, Te, or mixtures thereof.

A detailed explanation and illustrative examples of the above composition range follow below.

Figure 1:
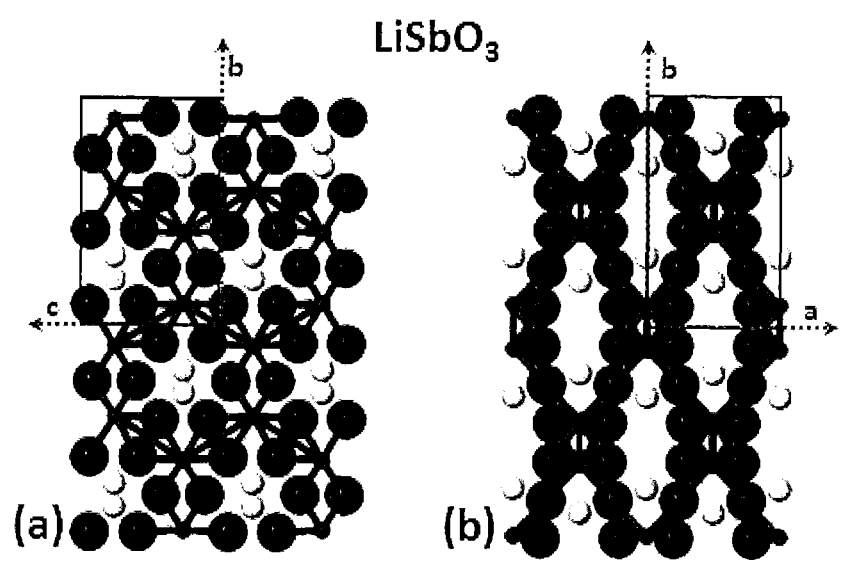
FIGS. 1(a) and (b): Cross section views of $LiSbO_3$ crystal structure (antimony (small red spheres) lithium (medium yellows spheres) oxygen (large blue spheres)). The unit cell is outlined in black with four making up each projection.

DETAILED DESCRIPTION $LiSbO_3$ and $LiNbO_3$ both have unique structures. The $LiSbO_3$-type structure has an orthorhombic crystal structure with space group Pncn or in the case of ordered $LiSbO_3$-type structural variants with space group Pnn2. In the ideal LiSbO$_3$-type structure consists of oxygen atoms form a distorted hexagonal close packed array (FIG. 1a) with two thirds of the octahedral voids filled by both lithium (yellow spheres) and antimony (red spheres) as shown in FIGS. 1a and 1b. The LiSbO$_3$-type structure features a chain of offset edge-sharing antimony (SbO$_6$) octahedra that run along the c-axis (FIGS. 1a and 1b). In the parent LiSbO$_3$-type structure antimony uniformly occupies these chains, but in related structures, an ordered array of two cations may reside on the antimony site shifting the space group from Pncn to Pnn2.

Figure 2:
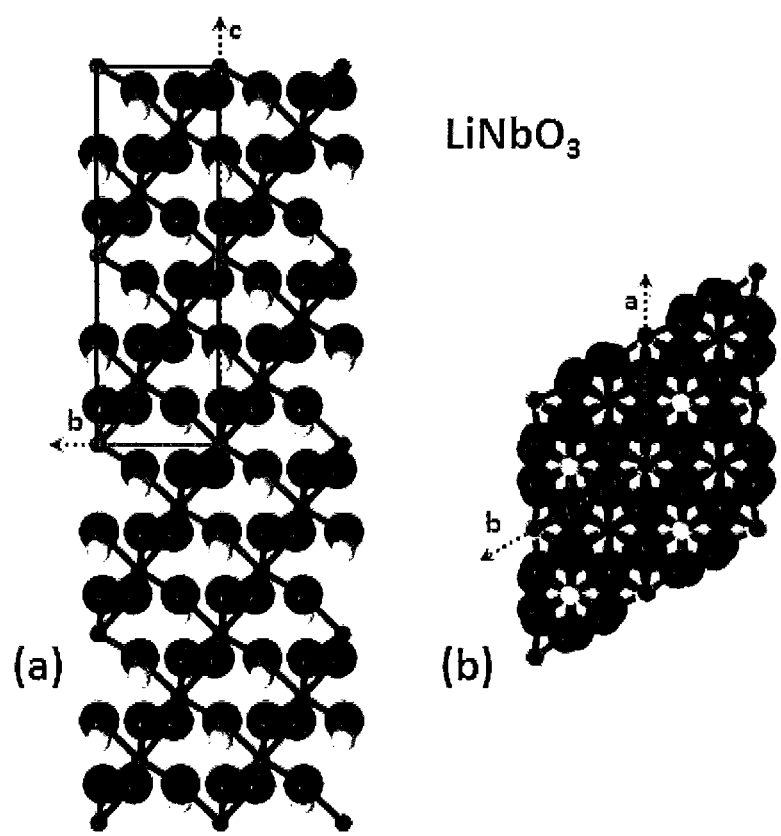
FIGS. 2(a) and (b): Cross section views of $LiNbO_3$ crystal structure (niobium (small red spheres) lithium (medium yellows spheres) oxygen (large blue spheres)). The unit cell is outlined in black with four making up each projection.

The LiNbO$_3$-type structure is a trigonal crystal structure with space group R3c (FIGS. 2a and 2b). The crystal structure can be considered an ordered variant of the ilmenite structure. Much like the LiSbO$_3$-type structure the LiNbO$_3$-type structure consists of a hexagonal close packed array of oxygen atoms forming distorted octahedral voids that are partially filled by lithium and niobium. Unlike the edge-shared SbO$_6$ octahedra of LiSbO$_3$-type structure the NbO$_6$ octahedra of the LiNbO$_3$-type structure are corner-shared.

Slight variances may occur in the space group for above structures where substitutions on the Sb/Nb site leads to additional ordering that increases structural symmetry from Pncn to Pnn2. In general the primary space group for the LiSbO3-type structure falls under No. 52 from the International Tables for Crystallography, but related structures have fallen under No. 56 and 34. Subgroups of space group No. 52 include No. 34, No. 33, No. 30, No. 017, No. 014, and No. 013 for k-index 1. The primary space group for the LiNbO3-type structure falls under No. 161 from the International Tables for Crystallography. A subgroup of space group No. 161 includes No. 146 for k-index 1.

The pigments of the present invention possess a crystal structure related to the LiSbO$_3$-type or LiNbO$_3$-type structures. These structures possess chemical formulas with the following variations:

$M^1M^5Z_3$, $M^1M^2M^4M^5Z_6$, $M^1M^3{}_2M^5Z_6$, $M^1M^2M^3M^6Z_6$, $M^1{}_2M^4M^6Z_6$, $M^1M^5M^6Z_6$, or combination thereof,
where the cation $M^1$ is an element with a valence of +1 or a mixture thereof;
where the cation $M^2$ is an element with a valence of +2 or a mixture thereof;
where the cation $M^3$ is an element with a valence of +3 or a mixture thereof;
where the cation $M^4$ is an element with a valence of +4 or a mixture thereof;
where the cation $M^5$ is an element with a valence of +5 or a mixture thereof;
where the cation $M^6$ is an element with a valence of +6 or a mixture thereof;
with M selected from H, Li, Na, K, Rb, Cs, Mg, Ca, Sr, Ba, Sc, Y, La, Ce, Pr, Nd, Sm, Eu, Gd, Tb, Dy, Ho, Er, Tm, Yb, Lu, Ti, Zr, Hf, V, Nb, Ta, Cr, Mo, W, Mn, Fe, Ru, Co, Ni, Cu, Ag, Zn, B, Al, Ga, In, Si, Ge, Sn, P, Sb, Bi, Te, where the anion Z is selected from N, O, S, Se, Cl, F, hydroxide ion or a mixture thereof; and where vacancies may reside on the M or Z site such that the structural type is retained. The term dopant is used to refer to substitutions that result in a deficiency or excess of the anion Z away from the ideal stoichiometry without substantially changing the structure. As well as variants that include M dopant additions below 20 atomic %, where the dopant is selected from H, Li, Na, K, Rb, Cs, Mg, Ca, Sr, Ba, Sc, Y, La, Ce, Pr, Nd, Sm, Eu, Gd, Tb, Dy, Ho, Er, Tm, Yb, Lu, Ti, Zr, Hf, V, Nb, Ta, Cr, Mo, W, Mn, Fe, Ru, Co, Ni, Cu, Ag, Zn, B, Al, Ga, In, Si, Ge, Sn, P, Sb, Bi, Te, or mixtures thereof. Also, in another example, for the formula $M^1M^5Z_6$, $M^1$ may at least be greater than 50 atomic % Li, and $M^5$ may at least be greater than 50 atomic % Sb. Further, in another example, where the chemical formula is selected from: $(M^1M^5)_{2-x}(M^2M^4)_xZ_6$, where 0<x<1; $(M^1M^5)_{2-x}(M^3M^3)_xZ_6$, where 0<x<1; or combinations thereof, $M^1$ may at least be greater than 50 atomic % lithium, and $M^2$ may at least be greater than 50 atomic % cobalt.

Other pigments, derived from solid solutions, may include those between $M^1M^5Z_3$ and $M^1M^2M^4M^5Z_6$, of the form $(M^1M^5)_{2-x}(M^2M^4)_xZ_6$ where 0<x<1 and between $M^1M^5Z_3$ and $M^1M^3M^3M^5Z_6$ of the form $(M^1M^5)_{2-x}(M^3M^3)_xZ_6$ where 0<x<1. Pigments may also be solid solutions between $(M^1M^5)_{2-x}(M^2M^4)_xZ_6$ and $(M^1M^5)_{2-x}(M^3M^3)_xZ_6$ where 0<x<1. Specifically, such pigments may include $(LiSb)_{2-x}(CoTi)_xO_6$, where 0<x<1, and where the pigment ranges from a pastel pink to a violet to a dull purple color; or where x=0.8, and the pigment is a violet color. Other pigments may include $(LiSb)_{2-x}(CoSn)_xO_6$, where 0<x<1, and where the pigment ranges from a pastel pink to a red-shade violet to a dull red-shade violet color and when x=0.5, and the pigment is a red-shade violet color. Other pigments may also include $(LiNb)_{2-x}(CoTi)_xO_6$, where 0<x<0.4 and where the pigment ranges from a off-white to a pastel purple to a dull purple shade black color, and when x=0.1, and the pigment is a pastel purple color. Other pigments may include $(LiTa)_{2-x}(CoTi)_xO_6$ where 0<x<0.4, and where the pigment ranges from an off-white to a violet to a dull purple color, and when x=0.2, the pigment is a light violet color. Pigments of the form $(M^1M^5)_{2-x}(M^3M^3)_xZ_6$ may include $(LiSb)_{2-x}(Fe_2)_xO_6$, where 0<x<1, and where the pigment ranges from an off-white to a yellow shade brown. Pigments with M dopant additions may be formed such as (Co,Al) doped LiSbO3 where the cobalt content is at 4 atomic % and the aluminum content is at 10 atomic % resulting a violet pigment.

Compounds in this technology may also include a LiSbO$_3$-type or LiNbO$_3$-type structure, with a chemical formula selected from the following formulae:

$(M^1M^5)_{2-x}(M^2M^4)_xZ_6$, where 0<x<1, $(M^1M^5)_{2-x}(M^3M^3)_xZ_6$, where 0<x<1, $(M^1M^2M^3)_{2-x}(M^6)_xZ_6$, wherein 0<x<1, $(M^1M^1M^4)_{2-x}(M^6)_xZ_6$, wherein 0<x<1, $(M^1M^5)_{2-x}(M^6)_xZ_6$, where 0<x<1, or combination thereof,
where the cation $M^1$ is an element with a valence of +1 or a mixture thereof,
where the cation $M^2$ is an element with a valence of +2 or a mixture thereof,
where the cation $M^3$ is an element with a valence of +3 or a mixture thereof,
where the cation $M^4$ is an element with a valence of +4 or a mixture thereof, where the cation $M^5$ is an element with a valence of +5 or a mixture thereof,
where the cation $M^6$ is an element with a valence of +6 or a mixture thereof,
where M selected from H, Li, Na, K, Rb, Cs, Mg, Ca, Sr, Ba, Sc, Y, La, Ce, Pr, Nd, Sm, Eu, Gd, Tb, Dy, Ho, Er, Tm, Yb, Lu, Ti, Zr, Hf, V, Nb, Ta, Cr, Mo, W, Mn, Fe, Ru, Co, Ni, Cu, Ag, Zn, B, Al, Ga, In, Si, Ge, Sn, P, Sb, or Te, where the anion Z is selected from N, O, S, Se, Cl, F, hydroxide ion or a mixture thereof, where vacancies may reside on the M or Z site such that the structural type is retained. The term dopant is used to refer to substitutions that result in a deficiency or excess of the anion Z away from the ideal stoichiometry without substantially changing the structure. As well as variants that include M dopant additions below 20 atomic %, where the dopant is selected from H, Li, Na, K, Rb, Cs, Mg, Ca, Sr, Ba, Sc, Y, La, Ce, Pr, Nd, Sm, Eu, Gd, Tb, Dy, Ho, Er, Tm, Yb, Lu, Ti, Zr, Hf, V, Nb, Ta, Cr, Mo, W, Mn, Fe, Ru, Co, Ni, Cu, Ag, Zn, B, Al, Ga, In, Si, Ge, Sn, P, Sb, Bi, Te, or mixtures thereof.

Potential uses for these materials may be in sol-gel type coatings and coil coatings (PVDF, polyester) as well as in cement, roofing granules, paint, ink, glass, enamel, ceramic glaze, plastics, sol-gel coatings, or decorative cosmetic applications.

Synthesis Routes:

There are multiple synthetic methods that may be employed to synthesize these materials. These include solid state sintering, solution synthesis (hydrothermal, precipatation, flame spray pyrolosis, and combustion synthesis), and ion exchange (through solution or molten salt techniques).

One method involves the use of the solid state sintering technique. The approriate elemental precursors (including oxides, carbonates, hydroxides, etc.) at the desired stoichiometry are intimately mixed and fired at temperatures ranging from 900° F. to 2300° F. under various atmospheres depending on the selected precursors. The resulting material is then milled to the desired size scale and color. Various sintering aids/mineralizers may be employed as well to reduce the firing temperature and minimize the loss of volatile constituents.

A surface coating/treatment may be applied to the resulting pigment for stabilization or functionalization in a range of applications.

The pigment may be incorporated into, or synthesized as part of, a composite material to either impart a benefit or functionality to the composite or to improve or enhance a property of the pigment.

EXAMPLES

Example 1

A mixture of 4.45 grams of cobalt oxide ($Co_3O_4$), 4.43 grams of titanium dioxide ($TiO_2$), 18.43 grams of lithium carbonate ($Li_2CO_3$), and 72.70 grams of antimony trioxide ($Sb_2O_3$) was homogenized using a Waring blender and calcined at 2,150° F. for 4 hours in air. The resulting material is a red-shade violet which can be milled to a pigmentary particle size that is light red-shade violet in coloration. A reversible color shift from light red-shade violet at room temperature to gray at 660° F. occurs.

Example 2

A mixture of 9.01 grams of cobalt oxide ($Co_3O_4$), 8.96 grams of titanium dioxide ($TiO_2$), 16.59 grams of lithium carbonate ($Li_2CO_3$), and 65.44 grams of antimony trioxide ($Sb_2O_3$) was homogenized using a Waring blender and calcined at 2,150° F. for 4 hours in air. The resulting material is bright violet which can be milled to a pigmentary particle size that is light violet in coloration. A reversible color shift from light violet at room temperature to gray at 660° F. occurs.

Example 3

A mixture of 13.69 grams of cobalt oxide ($Co_3O_4$), 13.62 grams of titanium dioxide ($TiO_2$), 14.70 grams of lithium carbonate ($Li_2CO_3$), and 57.99 grams of antimony trioxide ($Sb_2O_3$) was homogenized using a Waring blender and calcined at 2,150° F. for 4 hours in air. The resulting material is bright violet which can be milled to a pigmentary particle size that is violet in coloration. A reversible color shift from violet at room temperature to gray at 660° F. occurs.

Example 4

A mixture of 18.49 grams of cobalt oxide ($Co_3O_4$), 18.39 grams of titanium dioxide ($TiO_2$), 12.76 grams of lithium carbonate ($Li_2CO_3$), and 50.35 grams of antimony trioxide ($Sb_2O_3$) was homogenized using a Waring blender and calcined at 2,150° F. for 4 hours in air. The resulting material is bright purple which can be milled to a pigmentary particle size that is light purple in coloration. A reversible color shift from light purple at room temperature to gray at 660° F. occurs. This substance is also stable in a glass frit and sol-gel based coatings.

Example 5

A mixture of 23.42 grams of cobalt oxide ($Co_3O_4$), 23.29 grams of titanium dioxide ($TiO_2$), 10.78 grams of lithium carbonate ($Li_2CO_3$), and 42.51 grams of antimony trioxide ($Sb_2O_3$) was homogenized using a Waring blender and calcined at 2,150° F. for 4 hours in air. The resulting material has a purple color which can be milled to a pigmentary particle size that is dull purple in coloration. A reversible color shift from dull purple at room temperature to gray at 660° F. occurs.

Example 6

A mixture of 15.90 grams of cobalt oxide ($Co_3O_4$), 29.84 grams of stannic oxide ($SnO_2$), 10.97 grams of lithium carbonate ($Li_2CO_3$), and 43.29 grams of antimony trioxide ($Sb_2O_3$) was homogenized using a Waring blender and calcined at 2,000° F. for 4 hours in air. The resulting material is a red-shade violet which can be milled to a pigmentary particle size that is light red-shade violet coloration.

Example 7

A mixture of 2.37 grams of cobalt oxide ($CO_3O_4$), 2.36 grams of titanium dioxide ($TiO_2$), 20.72 grams of lithium carbonate ($Li_2CO_3$), and 74.55 grams of niobium pentoxide ($Nb_2O_5$) was homogenized using a Waring blender and calcined at 1,800° F. for 4 hours in air. The resulting material is purple which can be milled to a pigmentary particle size that is pastel purple in coloration.

Example 8

A mixture of 3.24 grams of cobalt oxide ($Co_3O_4$), 3.22 grams of titanium dioxide ($TiO_2$), 13.40 grams of lithium carbonate ($Li_2CO_3$), and 80.14 grams of tantalum pentoxide ($Ta_2O_5$) was homogenized using a Waring blender and calcined at 1,920° F. for 4 hours in air. The resulting material has violet color which can be milled to a pigmentary particle size that is light violet in coloration.

Example 9

A mixture of 6.47 grams of cobalt carbonate ($CoCO_3$), 4 grams of titanium dioxide ($TiO_2$), 16.65 grams of lithium carbonate ($Li_2CO_3$), and 72.89 grams of antimony pentoxide ($Sb_2O_5$) was homogenized using a Waring blender and calcined at 2,010° F. for 4 hours under flowing argon. The resulting material has a purple which can be milled to a pigmentary particle size that is light purple in coloration.

Figure 3:
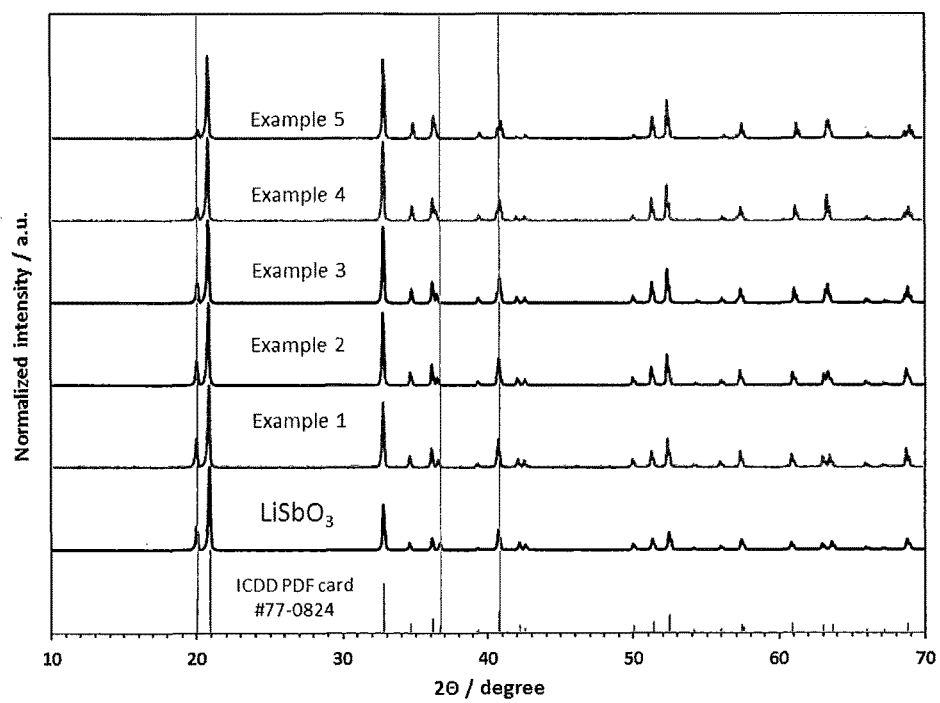
FIG. 3: Powder X-ray diffraction patterns for Examples 1 to 5 along with phase pure $LiSbO_3$ synthesized in the same manner. The ICDD PDF#77-0824 for $LiSbO_3$ is displayed for comparison. The gray lines are guides to compare relative peak positions.

X-Ray Powder Diffraction Data:

X-ray powder diffraction measurements were made at room temperature using a Rigaku X-ray diffractometer with Cu-Kα radiation at 40 kV and 40 mA. Powder diffraction measurements were made on Examples 1 to 8 along with single phase $LiSbO_3$, $LiNbO_3$, and $LiTaO_3$. The single phase samples were synthesized for comparison at temperatures of 2,100° F. ($LiSbO_3$), 1,800° F. ($LiNbO_3$), and 1,800° F. ($LiTaO_3$). The powder diffraction patterns for Examples 1 to 5 are displayed in FIG. 3 and consist of the solid solution $Li_{2-x}Co_xTi_xSb_{2-x}O_6$ for x=0.2, 0.4, 0.6, 0.8, and 1. The shifting of the powder diffraction peaks is indicative of the change in lattice parameters as the composition shifts from $LiSbO_3$ to $LiCoTiSbO_6$ (Example 5). The lattice parameters derived from these X-ray diffraction patterns are listed in Table 1. Overall the X-ray diffraction data displayed in FIG. 3 indicate that $LiSbO_3$ crystal structure holds for the full $Li_{2-x}Co_xTi_xSb_{2-x}O_6$ solid solution.

TABLE 1

Unit cell parameters derived from the powder diffraction pattern for Examples 1 to 8 along with parameters for $LiSbO_3$, $LiNbO_3$ and $LiTaO_3$ synthesized in the same manner.

|  |  | x | a (Å) | ± | b (Å) | ± | c (Å) | ± | V (Å³) | Space Group |
|---|---|---|---|---|---|---|---|---|---|---|
|  | $LiSbO_3$ | 0 | 5.195 | 0.0006 | 4.904 | 0.0005 | 8.504 | 0.0010 | 216.6 | Pncn |
| Example 1 | $Li_{2-x}Co_xTi_xSb_{2-x}O_6$ | 0.2 | 5.167 | 0.0008 | 4.895 | 0.0007 | 8.473 | 0.0011 | 214.3 | Pncn |
| Example 2 |  | 0.4 | 5.158 | 0.0013 | 4.904 | 0.0013 | 8.473 | 0.0017 | 214.4 | Pncn |
| Example 3 |  | 0.6 | 5.147 | 0.0007 | 4.907 | 0.0005 | 8.462 | 0.0010 | 213.7 | Pncn |
| Example 4 |  | 0.8 | 5.159 | 0.0006 | 4.931 | 0.0005 | 8.490 | 0.0009 | 216.0 | Pncn |
| Example 5 |  | 1 | 5.150 | 0.0003 | 4.934 | 0.0002 | 8.482 | 0.0004 | 215.5 | Pncn |
| Example 6 | $Li_{1.2}Co_{0.8}Sn_{0.8}Sb_{1.2}O_6$ |  | 5.255 | 0.0009 | 4.958 | 0.0007 | 8.589 | 0.0015 | 223.8 | Pnn2 |
|  | $LiNbO_3$ |  | 5.155 | 0.0009 | 5.155 | 0.0009 | 13.870 | 0.0017 | 319.3 | R3c |
| Example 7 | $Li_{1.9}Co_{0.1}Ti_{0.1}Nb_{1.9}O_6$ |  | 5.153 | 0.0007 | 5.153 | 0.0007 | 13.870 | 0.0014 | 318.9 | R3c |
|  | $LiTaO_3$ |  | 5.161 | 0.0012 | 5.161 | 0.0012 | 13.756 | 0.0022 | 317.3 | R3c |
| Example 8 | $Li_{1.8}Co_{0.2}Ti_{0.2}Ta_{1.8}O_6$ |  | 5.153 | 0.0004 | 5.153 | 0.0004 | 13.793 | 0.0008 | 317.2 | R3c |

Figure 4:
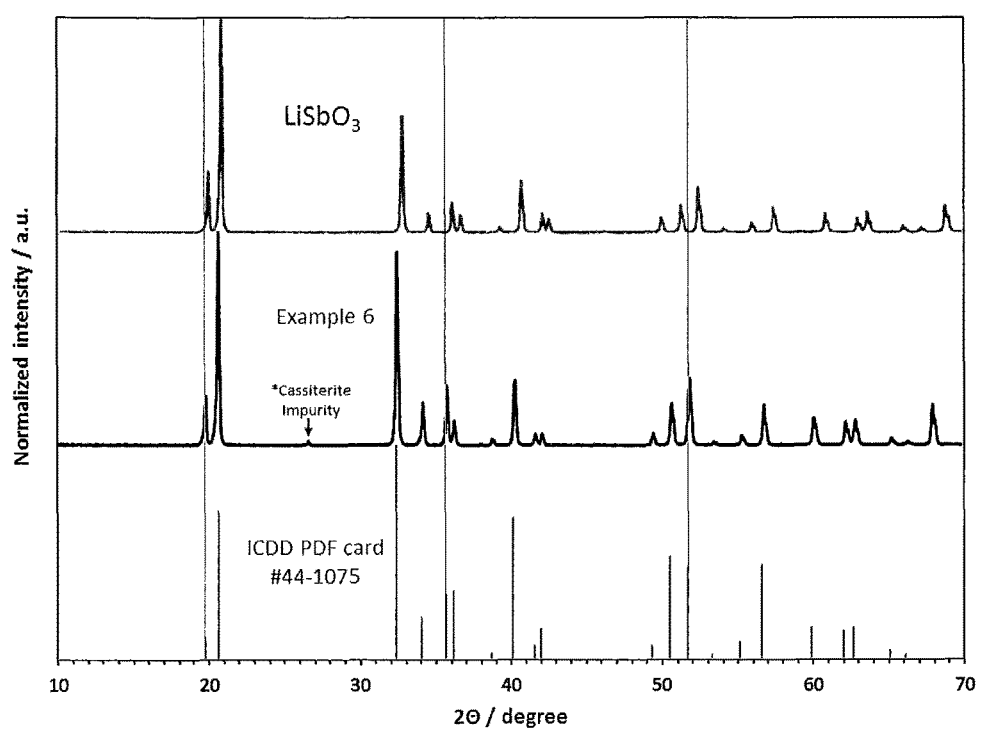
FIG. 4: Powder X-ray diffraction pattern for Example 6 along with phase pure $LiSbO_3$ synthesized in the same manner. The ICDD PDF#44-1075 for $LiCoSnSbO_6$ is displayed for comparison. The gray lines are guides to compare relative peak positions.

The X-ray diffraction pattern for Example 6 ($Li_{1.2}CO_{0.8}Sn_{0.8}Sb_{1.2}O_6$) is displayed in FIG. 4 along with single phase $LiSbO_3$. Aside from a small cassiterite impurity peak the powder diffraction pattern is consistent with the $LiSbO_3$ structure. The powder diffraction pattern for $Li_{1.2}Co_{0.8}Sn_{0.8}Sb_{1.2}O_6$ looks much like the diffraction pattern observed for the $LiSbO_3LiCoTiSbO_6$ solid solution, but with a slight symmetry modification from Pnna to Pnn2 as indicated in Table 1.

Figure 5:
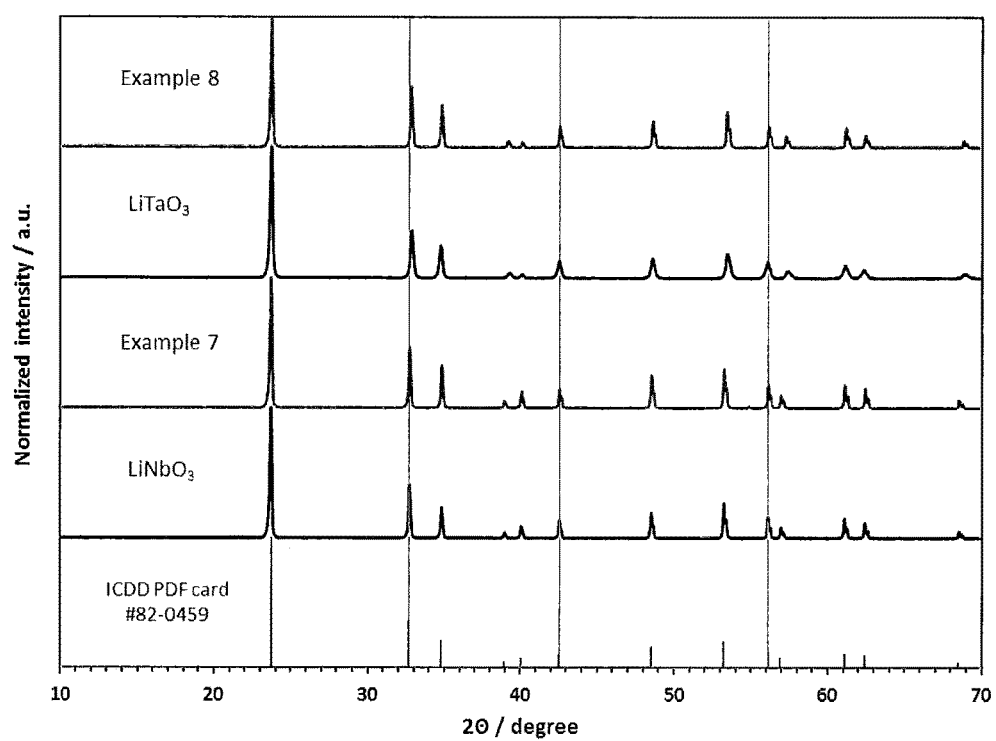
FIG. 5: Powder X-ray diffraction patterns for Examples 7 and 8 along with phase pure $LiNbO_3$ and $LiTaO_3$ synthesized in the same manner. The ICDD PDF#82-0459 for $LiNbO_3$ is displayed for comparison. The gray lines are guides to compare relative peak positions.

Single phase $LiTaO_3$ and $LiNbO_3$ are compared to Examples 7 ($Li_{1.9}CO_{0.1}Ti_{0.1}Nb_{1.9}O_6$) and 8 ($Li_{1.8}CO_{0.2}Ti_{0.2}Ta_{1.8}O_6$) in FIG. 5. The gray guide lines indicate the relative peak positions do not shift significantly between the examples and their parent compounds. The powder diffraction pattern for compositions displayed in FIG. 5 all fit the $LiNbO_3$-type crystal structure. The resulting lattice parameters for Examples 7 and 8 are displayed in Table 1 along with parameters derived from the $LiNbO_3$ and $LiTaO_3$ reference materials.

Particle Size Distribution Data:

In order to run color measurements the compositions from Examples 1 to 8 were ground to the particle size distributions listed in Table 2 below. Particle size distribution measurements were made using a Microtrac S3500 system and ranged from a fifty percentile of 2.8 microns to 4.8 microns. It should be noted that as the compositions are ground to a pigmentary particle size close to 1 micron the color shifts lighter and less chromatic.

TABLE 2

Particle size distribution data for Examples 1 to 8.
Particle Size Distributions

| | Example 1 | Example 2 | Example 3 | Example 4 | Example 5 | Example 6 | Example 7 | Example 8 |
|---|---|---|---|---|---|---|---|---|
| | | | | | Composition: | | | |
| | | | $Li_{2-x}Co_xTi_xSb_{2-x}O_6$ | | | | | |
| Percentiles | X = 0.2 Size (μm) | X = 0.4 Size (μm) | X = 0.6 Size (μm) | X = 0.8 Size (μm) | X = 1 Size (μm) | $Li_{1.2}Co_{0.8}Sn_{0.8}Sb_{1.2}O_6$ Size (μm) | $Li_{1.9}Co_{0.1}Ti_{0.1}Nb_{1.9}O_6$ Size (μm) | $Li_{1.8}Co_{0.2}Ti_{0.2}Ta_{1.8}O_6$ Size (μm) |
| 10% | 1.69 | 1.177 | 1.687 | 1.025 | 1.355 | 0.942 | 2.002 | 1.759 |
| 20% | 2.39 | 2.021 | 2.416 | 1.967 | 2.166 | 1.565 | 2.79 | 2.314 |
| 30% | 2.94 | 2.647 | 2.951 | 2.618 | 2.737 | 2.008 | 3.48 | 2.754 |
| 40% | 3.45 | 3.2 | 3.43 | 3.17 | 3.22 | 2.396 | 4.13 | 3.18 |
| 50% | 3.95 | 3.75 | 3.9 | 3.69 | 3.69 | 2.791 | 4.79 | 3.64 |
| 60% | 4.49 | 4.34 | 4.41 | 4.26 | 4.18 | 3.23 | 5.49 | 4.16 |
| 70% | 5.11 | 5.01 | 4.99 | 4.92 | 4.73 | 3.78 | 6.29 | 4.8 |
| 80% | 5.92 | 5.92 | 5.76 | 5.78 | 5.45 | 4.53 | 7.33 | 5.71 |
| 90% | 7.24 | 7.45 | 7.04 | 7.27 | 6.59 | 5.84 | 8.96 | 7.37 |
| 99% | 11.74 | 13.62 | 11.61 | 13.4 | 10.27 | 10.2 | 13.95 | 14.88 |
| Mean Volume | 4.28 | 4.18 | 4.22 | 4.08 | 3.91 | 3.19 | 5.21 | 4.25 |

Reflectance Spectra/Color:

PVDF/Acrylic masstone coatings were prepared using pigments from Examples 1 to 8. The coatings were applied to primed alumina substrates with a final dry film thickness of 2.2 mil. The reflectance as a function of wavelength and CIE L*a*b* color values were measured on the PVDF/Acrylic masstone drawdowns using a Perkin Elmer Lambda 900 spectrophotometer. All CIE* color values are for a D65 illuminant and 10 degree observer. The reflectance spectra for Examples 1 to 5 are displayed in FIG. 6 and consist of the solid solution series $Li_{2-x}Co_xTi_xSb_{2-x}O_6$ for x=to 0.2, 0.4, 0.6, 0.8, and 1 as listed in Table 1. The CIE L*a*b* color values for the composition range $(LiSb)_{2-x}(CoTi)_{1-x}O_6$ where $(0.2 \le x \le 0.8)$ displays values of L* from 45 to 65, a* from 5 to 20, and b* from −15 to −25. The main features observed in FIG. 6 for the reflectance spectra include a group of at least three absorption bands between 490 nm and 630 nm that shift to longer wavelengths as x increases. The characteristic cobalt absorption band between 1150 nm and 1700 nm is also observed through the entire series.

[28] FIG. 7 below compares the PVDF acrylic masstone reflectance spectra for Examples 4 ($Li_{1.2}CO_{0.8}Ti_{0.8}Sb_{1.2}O_6$) and 6 ($Li_{1.2}CO_{0.8}Sn_{0.8}Sb_{1.2}O_6$). The substitution of titanium by tin in Example 6 sharpens and shifts the absorption bands at 554 nm to 538 nm and from 1360 nm to 1330 nm. The reflectance peak at 459 nm in Example 4 broadens and shifts to 451 nm with tin substitution in Example 6. The changes in the reflectance spectra translate into a color shift from L*=50.81, a*=12.54, and b*=−22.93 for Example 4 to L*=55.02, a*=18.11, and b*=−14.56 in Example 6. In general the CIE L*a*b* color values for the full composition range $(LiSb)_{2-x}(CoSn)_{1-x}O_6$ where $(0.2 \le x \le 0.8)$ displays values of L* from 50 to 70, a* from 15 to 30, and b* from −15 to −30.

Figure 8:
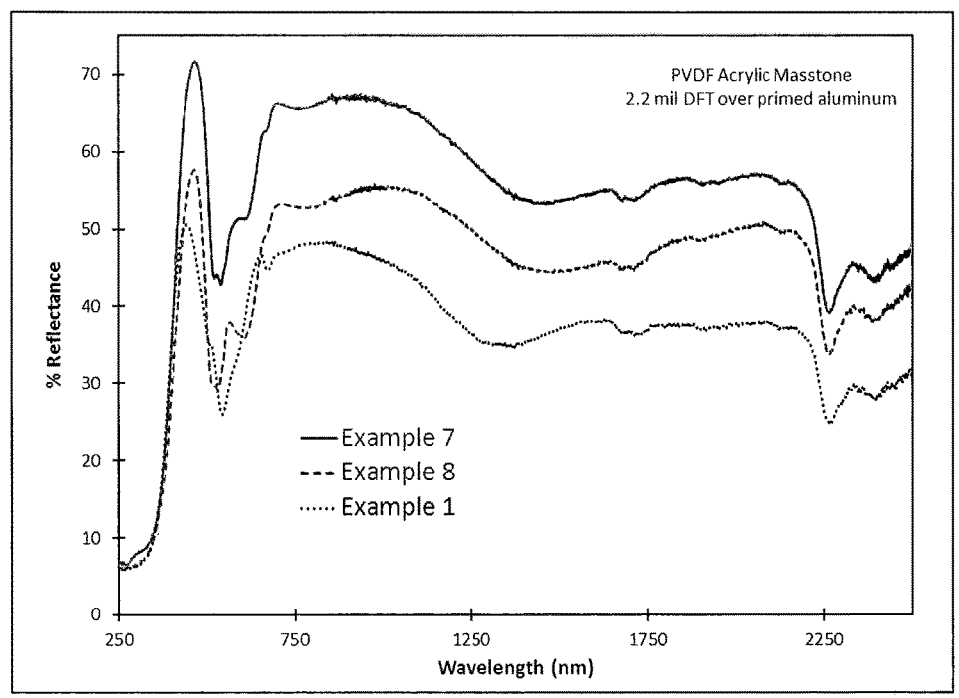
FIG. 8: Reflectance spectra for Examples 7 and 8 measured from 250 to 2500 nm with Example 4 displayed for comparison. Measurements were made on PVDF/acrylic masstone drawdowns with a 2.2 mil dry film thickness over primed aluminum.

In contrast to the $LiCoTiSbO_6$—$LiSbO_3$ solid solution the $LiNbO_3$ and $LiTaO_3$ analogs with the $LiNbO_3$-type crystal structure display a narrow solid solution range where desirable color can be achieved. The most chromatic color for the $Li_{2-x}Co_xTi_xSb_{2-x}O_6$ and $Li_{2-x}Sb_{2-x}Co_xSn_xO_6$ solid solutions occur where x ranges from $0.4 \le x \le 0.8$, while in the case of $Li_{2-x}Co_xTi_xNb_{2-x}O_6$ and $Li_{2-x}Co_xTi_xTa_2O_6$ the values are close to x=0.1 and 0.2, respectively. In general the CIE L*a*b* color values for the full composition range $(LiNb)_{2-x}(CoTi)_{1-x}O_6$ where $(0.05 \le x \le 0.4)$ displays values of L* from 70 to 80, a* from 4 to 8, and b* from −5 to −15. In general the CIE L*a*b* color values for the full composition range $(LiTa)_{2-x}(CoTi)_{1-x}O_6$ where $(0.05 \le x \le 0.4)$ displays values of L* from 65 to 75, a* from 5 to 10, and b* from −10 to −20. FIG. 8 below shows the similarity between Examples 1 and Examples 7 and 8. The reflectance peaks (~465 nm) for Examples 7 and 8 with the $LiNbO_3$-type crystal structure are shifted to slightly higher wavelengths relative to Example 1 (the $LiSbO_3$ analog). There is also a significant shift in the absorption bands between 500 nm and 700 nm with the formation of a step like feature (~570 nm) in Examples 7 and 8. The changes in the reflectance spectra for Examples 7 and 8 result in colors that are shifted green with much lower a* values than Example 1 as shown in Table 3.

TABLE 3

Figure 6:
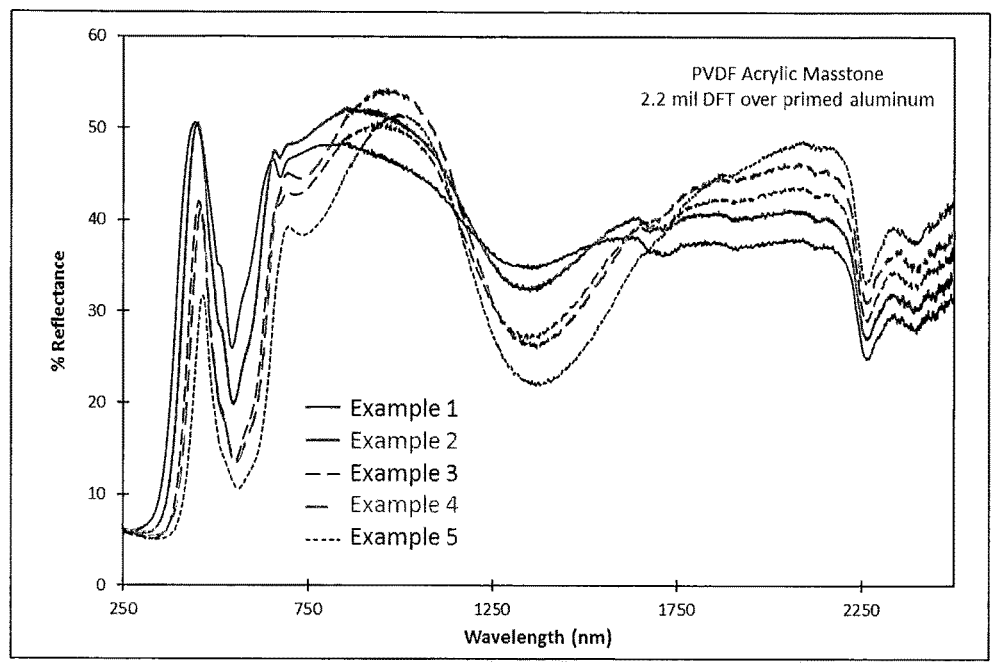
FIG. 6: Reflectance spectra for Examples 1 to 5 measured from 250 to 2500 nm. Measurements were made on PVDF/acrylic masstone drawdowns with a 2.2 mil dry film thickness over primed aluminum.
Figure 7:
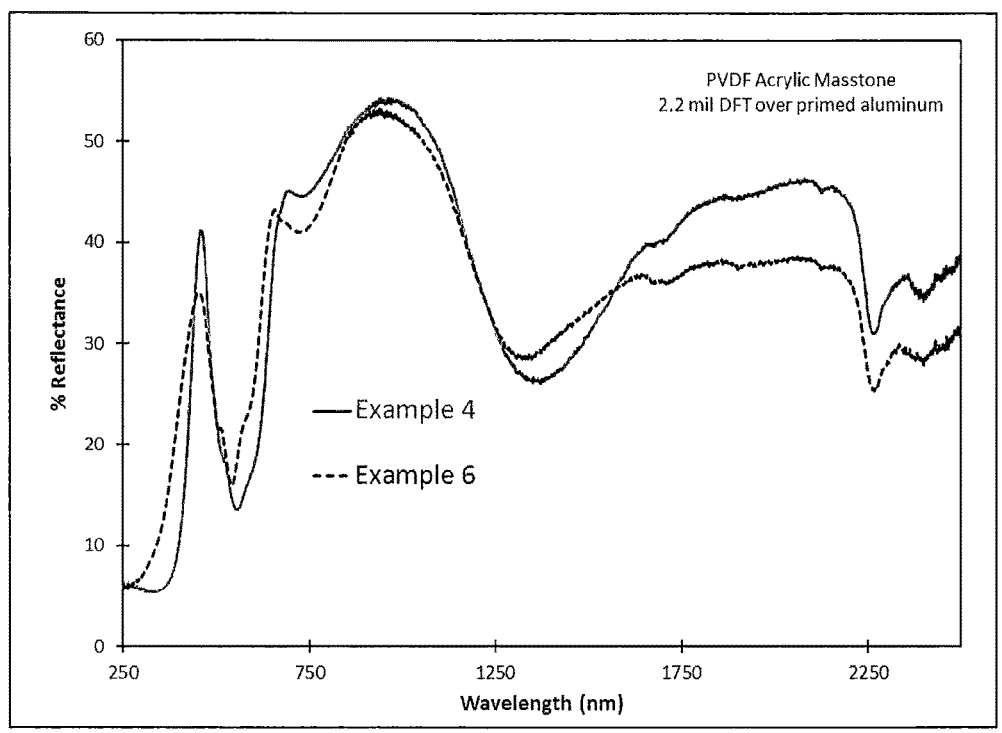
FIG. 7: Reflectance spectrum for Example 6 measured from 250 to 2500 nm with Example 4 displayed for comparison. Measurements were made on PVDF/acrylic masstone drawdowns with a 2.2 mil dry film thickness over primed aluminum.

CIE color data for Examples 1 to 8 calculated from reflectance curves in FIGS. 6, 7, and 8. Measurements were made on PVDF/acrylic masstone drawdowns with a 2.2 mil dry film thickness over primed aluminum.

| | CIE L* | CIE a* | CIE b* | C* | h° |
|---|---|---|---|---|---|
| Example 1 | 64.88 | 12.88 | −16.45 | 20.89 | 308.06 |
| Example 2 | 59.72 | 16.45 | −22.69 | 28.03 | 305.94 |
| Example 3 | 51.57 | 16.44 | −24.49 | 29.50 | 303.87 |
| Example 4 | 50.81 | 12.54 | −22.93 | 26.13 | 298.67 |
| Example 5 | 45.16 | 7.16 | −18.25 | 19.60 | 291.42 |
| Example 6 | 55.02 | 18.11 | −14.56 | 23.24 | 321.20 |
| Example 7 | 76.62 | 6.84 | −14.22 | 15.78 | 295.69 |
| Example 8 | 67.13 | 9.65 | −17.54 | 20.02 | 298.82 |

Perkin Elmer Lambda900 UV/VIS/NIR Spectrophotometer
D65 illuminant with a 10 degree observer Acid/Base Stability:

Modified Kesternich testing was performed in which primed aluminum panels coated with PVDF/acrylic underwent a series of 7-hour exposures to a sulfur dioxide atmosphere followed by measurements of color and gloss. The color measurements were performed on a Datacolor 600 reflection spectrophotometer and 60° gloss measurements were performed using a BYK Gardner Micro Tri-gloss meter. Along with drawdowns of Examples 1 through 8, C.I. Pigment Violet 14 (Shepherd Color Violet 92) and C.I. Pigment Blue 28 (Shepherd Color Blue 424) were included for comparison. The full Kesternich testing included a total of 8 cycles of 7-hour exposure to sulfur dioxide (SCTM 276). The color and gloss changes that ocurred over these 8 cycles are displayed in FIGS. 9 through 12 below. The change in color is summarized in the $\Delta E^*$ vs Kesternich cycle FIGS. 9 and 10 where $\Delta E^* \sqrt{=((\Delta L^*)^2+(\Delta a^*)^2+(\Delta b^*)^2)}$.

Figure 9:
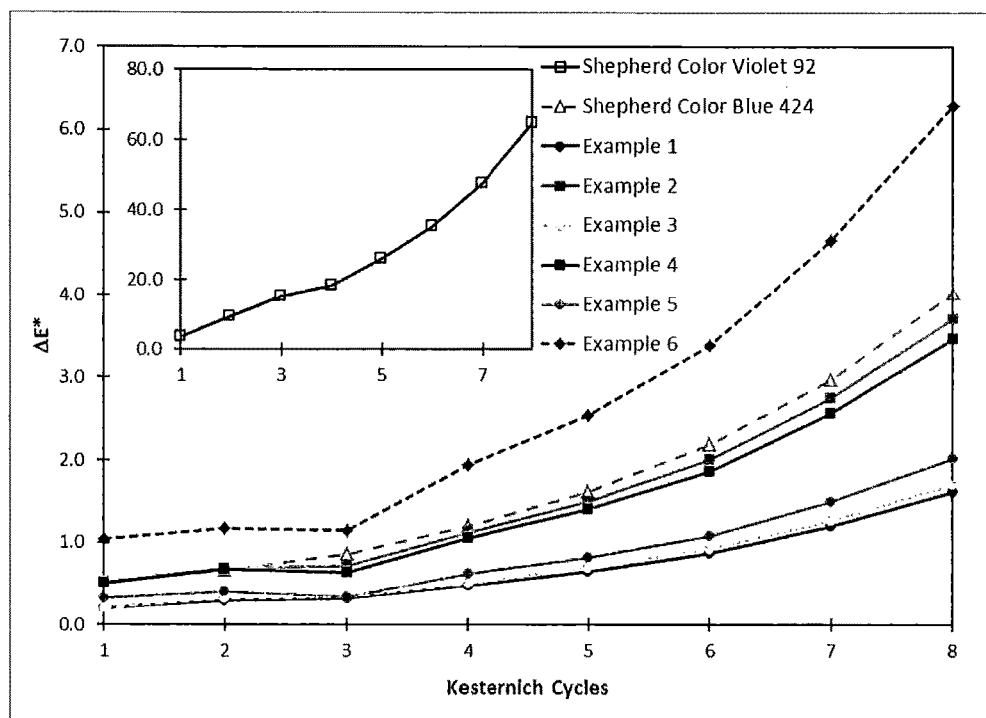
FIG. 9: $\Delta E^*$ as a function of time over eight Kesternich cycles.
Figure 10:
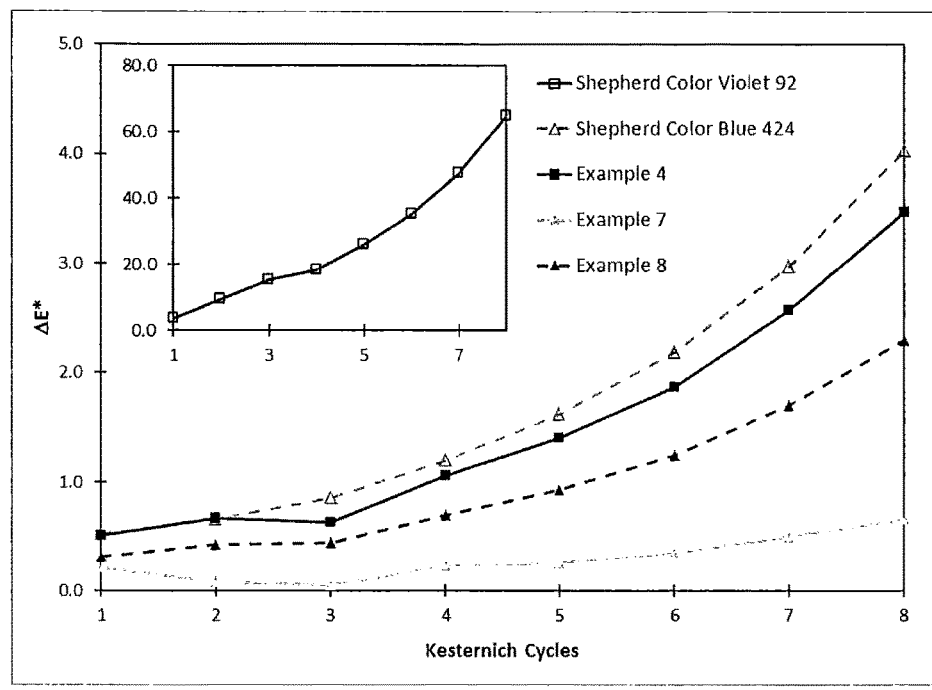
FIG. 10: $\Delta E^*$ as a function of time over eight Kesternich cycles.
Figure 11:
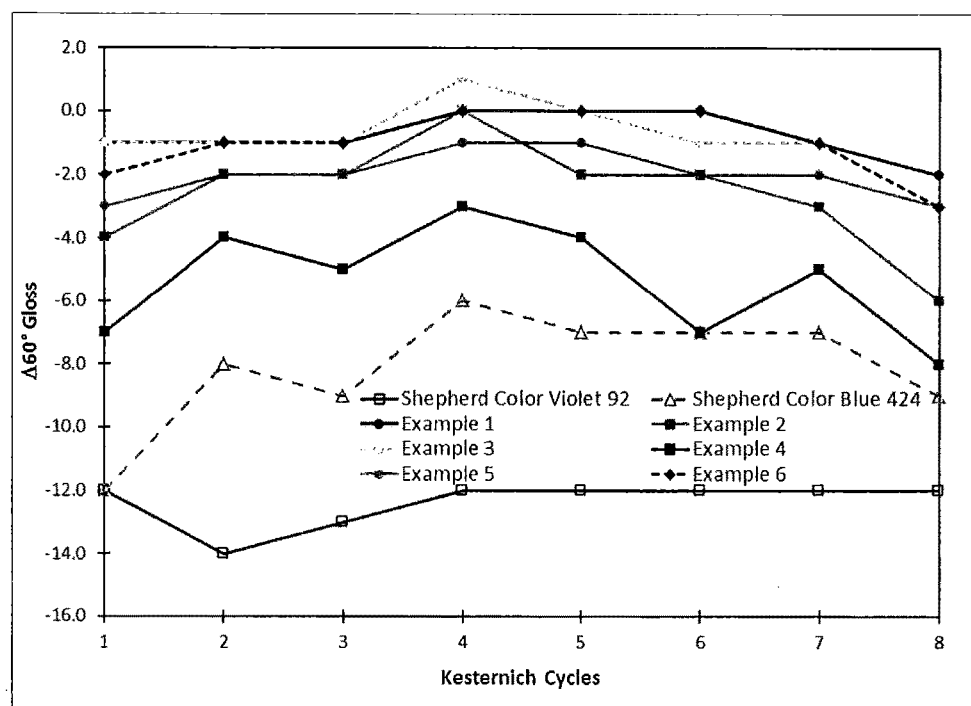
FIG. 11: $\Delta 60°$ Gloss as a function of time over eight Kesternich cycles.
Figure 12:
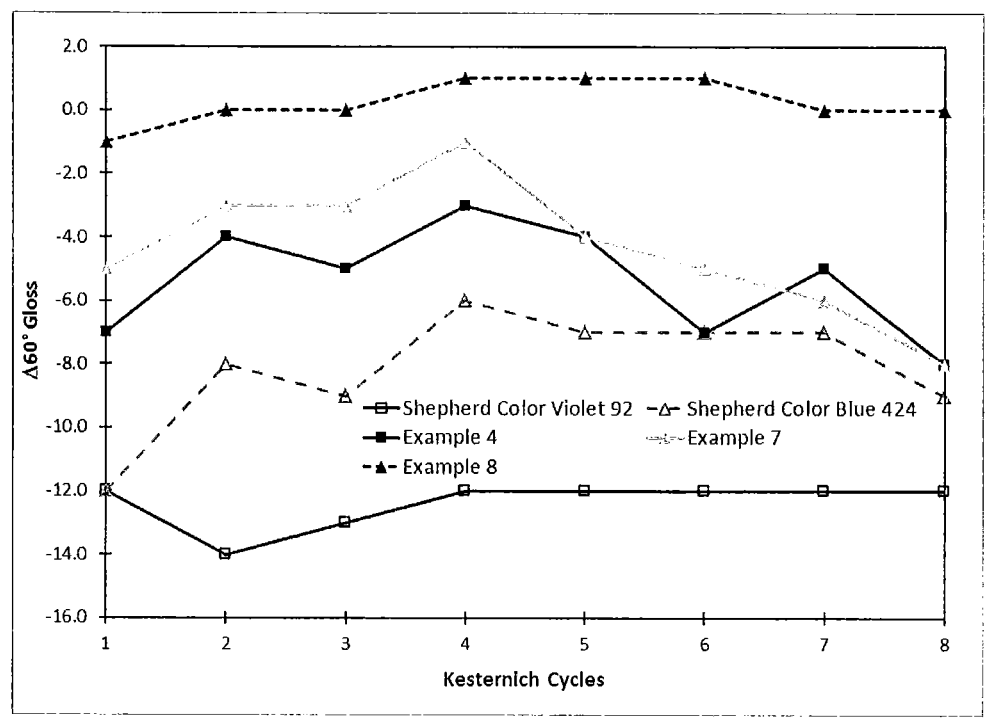
FIG. 12: $\Delta 60°$ Gloss as a function of time over eight Kesternich cycles.

The insets to FIGS. 9 and 10 are included to show the change in color for Shepherd Color Violet 92 over the full set of 8 Kesternich cycles. In terms of $\Delta E^*$ the Figures show that all the examples are much better than Shepherd Color Violet 92 and except for Example 6 ($Li_{1.2}Co_{0.8}Sn_{0.8}Sb_{1.2}O_6$) all the examples display similar or better behavior than Shepherd Color Blue 424. Example 7 ($Li_{1.9}Co_{0.1}Ti_{0.1}Nb_{1.9}O_6$) exhibited the lowest value with $\Delta E^*$ much less than 1 following 8 exposure cycles. The gloss measurements in FIGS. 11 and 12 show that all the examples display a lower change in gloss than both Shepherd Color Violet 92 and Shepherd Color Blue 424. The smallest gloss difference is achieved in Examples 1 ($Li_{1.8}CO_{0.2}Ti_{0.2}Sb_{1.8}O_6$) and 8 ($Li_{1.8}Co_{0.2}Ti_{0.2}Ta_{1.8}O_6$).

Figure 13:
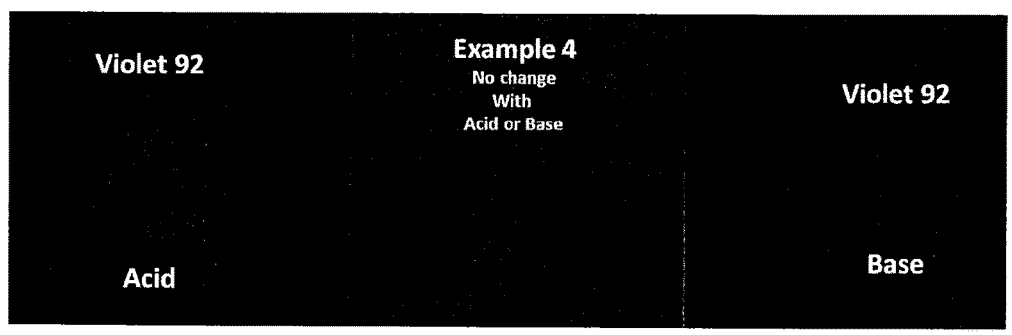
FIG. 13: PVDF/acrylic coatings on primed aluminum panels using Shepherd Color Violet 92 and Example 4. The panel on the left shows Shepherd Color Violet 92 following 24 hours of exposure to a 5% HCl solution. The center panel shows Example 4, which did not change in color following seven days of exposure to 5% HCl or 5% NaOH solutions. The right panel shows Shepherd Color Violet 92 following 24 hours of exposure to 5% NaOH solution.

Along with standard Kesternich testing two additional acid/base stability tests were performed on Example 4. In the first of these tests PVDF/acrylic panels of Example 4 and Shepherd Color Violet 92 were exposed to 5% solutions of HCl and NaOH. During the test 1 milliliter aliquots of 5% HCl and 5% NaOH solutions are placed on two separate spots on each panel and then covered with watch glasses. After 24 hours of exposure the solutions are removed and the panels are cleaned and evaluated for signs of failure or color change. Once evaluated the acid/base solutions are placed back on the same spots on the panels and this process continues for seven days. The results of this testing are displayed in FIG. 13 below and show that following one day of exposure Example 4 is unchanged while Shepherd Color Violet 92 has changed color in both acid and base. The testing was continued on Example 4 for full seven day test duration with no observed change (see FIG. 13 below).

The second set of acid/base stability testing on Example 4 was performed on the pigment powder. During this test 1 gram of pigment based on Example 4 was placed in two separate 3 mL vials. The first of these vials was then filled with a 5% solution of HCl and the second filled with 5% NaOH. The samples were then monitored for color change to the powder or the solutions. In the case of Example 4 there was no observable change in color to the powder or solution following two months of exposure. As a reference Shepherd Color Violet 92 pigment powder was compared under the same conditions. Unlike Example 4, a color change was observed within hours for the vials containing Shepherd Color Violet 92.

Weathering:

Accelerated weathering measurements were performed with a QUV machine that included UV (UVA-340 lamp) and moisture exposure. Test panels used for accelerated weathering are the same as the PVDF/acrylic drawdowns used for the modified Kesternich testing above. Color measurements were performed on a Datacolor 600 reflection spectrophotometer and 60° gloss measurements were performed using a BYK Gardner Micro Tri-gloss meter. Table 4 below shows the accelerated weather data at 500 and 1000 hours for Examples 1 to 8 and Shepherd Color Violet 92 and Blue 424. The weathering data in Table 4 show that overall change in color ($\Delta E^*$) is highest for Examples 1 and 2. As the composition increases in Co and Ti content in Examples 3 to 5, the $\Delta E^*$ becomes lower than that for Blue 424 or Violet 92. The substitution of titanium by tin in Example 6 ($Li_{1.2}CO_{0.8}Sn_{0.8}Sb_{1.2}O_6$) also results in improved weathering over Violet 92 and Blue 424. Examples 7 and 8 with the $LiNbO_3$-type structure both display improved weathering over Violet 92 and Blue 424.

Pigments in the violet color space derived from the $LiSbO_3$ and $LiNbO_3$-type structures may have significant chemical and weathering stability over that of most violet pigments currently used in industry. In specific examples above the stability is such that these pigments are comparable in performance to the current industry standard complex inorganic pigments used for long term high durability applications.

TABLE 4

Accelerated weathering data for Examples 1 to 8, Shepherd Color Violet 92 and Shepherd Color Blue 424 at 500 and 1000 hours for two different test panels. Test panels were masstone drawdowns of PVDF/acrylic on primed aluminum.

| | | | 500 HOURS | | | | | 1000 HOURS | | | | |
|---|---|---|---|---|---|---|---|---|---|---|---|---|
| | Sample | Panel # | $\Delta L^*$ | $\Delta a^*$ | $\Delta b^*$ | $\Delta E^*$ | $\Delta 60°$ Gloss | $\Delta L^*$ | $\Delta a^*$ | $\Delta b^*$ | $\Delta E^*$ | $\Delta 60°$ Gloss |
| PVDF/Acrylic Masstone | Blue 424 | 1 | −0.3 | −0.7 | 1.5 | 1.7 | 0 | −0.4 | −1.0 | 2.3 | 2.6 | 0 |
| | | 2 | −0.4 | −0.6 | 1.6 | 1.8 | 0 | −0.5 | −0.9 | 2.4 | 2.6 | 0 |
| | Violet 92 | 1 | 0.7 | −1.9 | 0.4 | 2.1 | −2 | 1.1 | −3.1 | 0.1 | 3.3 | −2 |
| | | 2 | 0.8 | −1.4 | 0.2 | 1.6 | −1 | 1.1 | −2.5 | −0.1 | 2.7 | −1 |
| | Example 1 | 1 | −2.9 | 0.1 | 5.9 | 6.6 | 0 | −3.6 | −0.1 | 6.9 | 7.8 | 0 |
| | | 2 | −2.7 | 0.0 | 5.9 | 6.5 | 0 | −3.4 | −0.2 | 6.8 | 7.6 | 0 |
| | Example 2 | 1 | −1.5 | −0.1 | 4.0 | 4.3 | −1 | −2.0 | −0.2 | 5.2 | 5.6 | −1 |
| | | 2 | −1.3 | 0.0 | 3.5 | 3.7 | −2 | −1.8 | −0.2 | 4.7 | 5.0 | −2 |
| | Example 3 | 1 | 0.0 | 0.5 | 0.3 | 0.6 | 0 | −0.2 | 0.4 | 0.7 | 0.8 | −1 |
| | | 2 | 0.1 | 0.4 | 0.4 | 0.6 | −1 | −0.1 | 0.4 | 0.8 | 0.9 | −1 |
| | Example 4 | 1 | 0.0 | 0.7 | 0.1 | 0.7 | −1 | 0.0 | 0.7 | 0.3 | 0.7 | −1 |
| | | 2 | 0.1 | 0.7 | 0.2 | 0.7 | −2 | 0.0 | 0.6 | 0.4 | 0.7 | −1 |
| | Example 5 | 1 | 0.0 | 0.7 | −0.3 | 0.8 | 0 | 0.0 | 0.7 | −0.1 | 0.8 | 0 |
| | | 2 | 0.1 | 0.8 | −0.4 | 0.9 | −1 | 0.0 | 0.8 | −0.2 | 0.9 | −1 |
| | Example 6 | 1 | −0.6 | 0.0 | 1.3 | 1.5 | −3 | −0.7 | −0.1 | 1.5 | 1.7 | −2 |
| | | 2 | −0.6 | 0.0 | 1.2 | 1.4 | −2 | −0.8 | −0.1 | 1.5 | 1.7 | −3 |
| | Example 7 | 1 | 0.0 | 0.7 | −1.3 | 1.4 | −1 | −0.2 | 0.5 | −1.0 | 1.1 | −1 |
| | | 2 | −0.1 | 0.5 | −1.0 | 1.1 | −2 | −0.2 | 0.4 | −0.7 | 0.9 | −2 |
| | Example 8 | 1 | 0.0 | 0.3 | −0.4 | 0.5 | −1 | −0.1 | 0.3 | −0.3 | 0.5 | −1 |
| | | 2 | −0.1 | 0.5 | −0.6 | 0.8 | 0 | −0.1 | 0.5 | −0.5 | 0.7 | 0 |

What is claimed:

1. A pigment comprising a compound with a $LiSbO_3$-type structure, where the chemical formula is $(LiSb)_{1.2}(CoTi)_{0.8}O_6$ and comprising an optional dopant.

2. The pigment of claim 1 where the dopant is selected from Mg, Ca, Sr, Ba, Y, La, Ce, Pr, Nd, Ti, Zr, Hf, Cr, Mo, W, Mn, Fe, Ru, Co, Ni, Cu, Ag, Zn, B, Al, Ga, In, Si, Ge, Sn, P, Sb, Bi, or combinations thereof.

3. The pigment of claim 1 where the dopant is selected from Al, Cr, Mn, Fe, Co, Ni, Cu, Si, Sn, Ti, Zr, P, Bi, or mixtures thereof.

4. The pigment of claim 1 with no dopant present.

* * * * *